(12) United States Patent
Aro et al.

(10) Patent No.: US 8,858,137 B2
(45) Date of Patent: Oct. 14, 2014

(54) LOAD DEVICE FOR VEHICLES

(75) Inventors: Lasse Aro, Trollhättan (SE); Martin C. Widen, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 1285 days.

(21) Appl. No.: 12/086,149

(22) PCT Filed: Dec. 22, 2006

(86) PCT No.: PCT/SE2006/001494
§ 371 (c)(1),
(2), (4) Date: Feb. 5, 2009

(87) PCT Pub. No.: WO2007/073313
PCT Pub. Date: Jun. 28, 2007

(65) Prior Publication Data
US 2009/0169322 A1 Jul. 2, 2009

(30) Foreign Application Priority Data
Dec. 22, 2005 (SE) ...................................... 0502862

(51) Int. Cl.
*B60P 7/08* (2006.01)
*B60R 7/02* (2006.01)

(52) U.S. Cl.
CPC *B60R 7/02* (2013.01); *B60P 7/0892* (2013.01)
USPC .............................. 410/94; 410/120; 410/121

(58) Field of Classification Search
CPC ........ B60P 7/08; B60P 7/0876; B60P 7/0892; B60P 7/135; B60P 7/14; B60R 9/065
USPC ............. 410/46, 34, 35, 77, 94, 95, 120, 121, 410/129, 130, 140, 141, 143, 150, 89; 224/403, 404, 495, 510, 531, 42.33, 224/42.34, 548, 551, 554, 567, 925; 296/37.5, 37.8, 37.14, 37.16; 248/149, 248/150, 351, 354.1
See application file for complete search history.

(56) References Cited

U.S. PATENT DOCUMENTS

| | | | |
|---|---|---|---|
| 4,094,546 A | * | 6/1978 | Glassmeyer et al. |
| 6,616,389 B1 | | 9/2003 | Ament et al. |
| 7,241,092 B2 | * | 7/2007 | Lim ................................ 410/94 |

FOREIGN PATENT DOCUMENTS

| | | |
|---|---|---|
| DE | 10134887 | 2/2003 |
| EP | 0535426 | 4/1993 |
| FR | 2669873 | 6/1992 |
| JP | 2000/335311 | 12/2000 |

* cited by examiner

*Primary Examiner* — Stephen Gordon
(74) *Attorney, Agent, or Firm* — Ingrassia Fisher & Lorenz, P.C.

(57) ABSTRACT

The present invention relates to a load device (1) for a vehicle, comprising at least one elongate guide rail (3) which is formed with a slide groove (5), said guide rail (3) being arranged to receive at least one load holding element (15) which is displaceable relative to the guide rail (3) along said slide groove (5) during positioning of said load holding element (15) in a desired position, said guide rail (3) having a first slide groove portion (7) with a first direction of extension and a second slide groove portion (9) with a second direction of extension deviating from the first, said slide groove portions (7, 9) continuously merging into each other.

16 Claims, 4 Drawing Sheets

LOAD DEVICE FOR VEHICLES

FIELD OF THE INVENTION

The present invention relates to a load device for a vehicle, comprising at least one elongate guide rail which is formed with a slide groove, said guide rail being arranged to receive at least one load holding element which is displaceable relative to the guide rail along said slide groove during positioning of said load holding element in a desired position.

TECHNICAL BACKGROUND

The load compartment of most vehicles has a loading capacity, i.e. floor area in this case, sufficient to accommodate and transport a number of items, such as carrier bags, cardboard containers, bags or other luggage. In many cases, the items loaded do not take up the entire loading area and therefore, when driving a loaded vehicle, these items often "roll" around in the load compartment if not secured in some way. An easy way of securing a load is to simply equip the load compartment with loops, in which straps intended to hold the load can be fastened.

A load securing device can also be formed as a netting, a bar or the like extending transversely to the load compartment, seen in the driving direction of the vehicle. Such a load securing device can be adjustably arranged so as to be displaceable in the driving direction of the vehicle. This allows the load securing device to be positioned in various positions, and it can thus be used to form a limited space between the load securing device and surrounding parts of the vehicle body, in which limited space the items that are to be loaded can be placed.

However, these load securing devices have limited positioning capability. Moreover, in most cases, these load securing devices cannot be placed in such a way that it will be easy to load items into the load compartment of a vehicle. Nor is it possible, in many cases, to store such load securing devices in a desirable manner in the load compartment of the vehicle when not used for securing loads.

SUMMARY OF THE INVENTION

It is an object of the present invention to provide a load device which at least partially satisfies the needs stated above. This object can be achieved by a load device as mentioned by way of introduction being given the features defined in claim 1. Other advantageous embodiments of such a load device will be described in the claims dependent on claim 1.

According to one aspect of the present invention, a load device for a vehicle comprises at least one elongate guide rail which is formed with a slide groove, said guide rail being arranged to receive at least one load holding element which is displaceable relative to the guide rail along said slide groove during positioning of said load holding element in a desired position, which guide rail has a first slide groove portion with a first direction of extension and a second slide groove portion with a second direction of extension deviating from the first, said slide groove portions continuously merging into each other. One advantage of this design is that a load compartment of a vehicle provided with such a load device can be optionally adjusted in a large number of ways to allow storage and load securing of items that are to be transported. A slide groove which has at least two slide groove portions with different extensions relative to each other advantageously allows the load holding element to be arranged with an extension in a number of different directions by being displaced along the slide groove. In addition, the design of the load device enables the load holding element to be easily placed in a storage position along the slide groove so as to make the major part of the load compartment of the vehicle available.

Suitably, the guide rail further comprises a third slide groove portion which is spaced-apart from the first slide groove portion, said third slide groove portion continuously merging into the second slide groove portion. By this solution, the load holding element can be optionally located in an additional number of positions by being displaced along the slide groove. As the portions of the slide groove are continuously connected to each other, the slide groove is suitably arranged as a continuous loop extending along substantially the entire extension of the guide rail. By arranging the slide groove as a continuous loop along the guide rail, the load holding element can be displaced in an advantageous manner along the entire slide groove. Another advantage of this design is that the load holding element can be moved, via the second slide groove portion, from the first slide groove portion to the third slide groove portion, and vice versa. Accordingly, the load device can be arranged so that the load holding element can be moved from one side of the load compartment of a vehicle to the opposite side.

According to one embodiment, the second slide groove portion is suitably arranged between said first and third slide groove portions. Furthermore, the third slide groove portion suitably has a substantially parallel direction of extension relative to the first slide groove portion. This design is advantageous since the load holding element can be connected to the first and the third slide groove portion while being displaced with a translation motion.

Preferably, the direction of extension of the second slide groove portion is substantially transverse to the directions of extension of the first and third slide groove portions. This design allows the slide groove to be arranged in an often desirable manner to extend along at least three sides of the load compartment of the vehicle. Suitably, the first and third slide groove portions are arranged with an extension in the driving direction of a vehicle, the second slide groove portion thus being arranged with an extension transversely to the driving direction of the vehicle. The slide groove is suitably arranged, for instance, with a U-shaped extension, which advantageously allows good variation possibilities concerning the positioning of the load holding element.

To further increase the positioning possibilities of the load holding element, the guide rail can have at least one additional fourth slide groove portion which is arranged substantially parallel to the second slide groove portion and continuously merges into at least one of the first and the third slide groove portion. Suitably, end portions of said fourth slide groove portion, at their respective ends, continuously merge into, respectively, the first and the third slide groove portion. Accordingly, the slide groove forms a closed loop, along which the load holding element can be displaced in optional manner.

In a preferred embodiment, the second slide groove portion is arranged on a portion of the guide rail which is located closest to the rear end of a vehicle. By such a design, the load holding element can easily and advantageously be reached by a user standing outside the vehicle when the load holding element is to be displaced along the slide groove. Furthermore, by this design, the load holding element can be placed in a position close to the rear end of the load compartment, which makes it possible to use the entire area of the load compartment in front of the load holding element to load items that are to be transported.

Suitably, the load holding element is arranged as a load compartment partition which is displaceably connected to said guide rail. This design of the load holding element allows the load compartment of a vehicle to be divided into sections, which substantially correspond to the space taken up by the load that is to be transported. This reduces the risk of the load "rolling" around in the load compartment during transport, and the load can thus be transported more safely. "More safely" here means both that the load as such can be protected and that other items and people can be protected from being affected by the load.

Such a load compartment partition is suitably made of a self-supporting material to obtain a stable and safe load-holding action. The load compartment partition can, for instance, be made of aluminium, steel, plastic material, etc. Furthermore, the load compartment partition is suitably arranged as a bar or a rack, for instance in the form of a frame structure. It will be understood that the load compartment partition can also have the form of a netting or a strap which is attached to elements that can be connected to the guide rail and displaced along the slide groove.

Preferably, the load compartment partition is arranged to be detachable from its connection to said guide rail. This may be advantageous, for instance, so as to avoid that the load compartment partition takes up space in the load compartment of a vehicle when not used. The load compartment partition can, for instance, be stored outside the vehicle or in a storing space arranged in the vehicle, for instance a storing space arranged under the load compartment floor. Furthermore, in some cases, it may be suitable for the load compartment partition to be disconnectable when it is to be moved to a new position.

According to a preferred embodiment, the load compartment partition consists of at least two parts which are arranged to be movable relative to each other so as to allow the length of the load compartment partition to be adjustable. By providing the load compartment partition with an adjustable length, there are more variation possibilities concerning the positioning of the load compartment partition. The extension of the load compartment partition can, for instance, be positioned at different angles between two spaced-apart slide groove portions. An adjustable length may also be suitable when the load compartment partition is to be stored, since it can be collapsed, when it is to be stored, to a position in which its length is as short as possible, thus taking up less space. The storage can be obtained both by the load compartment partition being placed in a storage position along the slide groove when connected to the guide rail or by the load compartment partition being disconnected from the guide rail and stored in an optional place, for instance under a load compartment floor of a vehicle.

To secure a load of loose items in an alternative way, the load compartment partition may comprise a frame element and a load securing element which is arranged to be connectable to said frame element and movable to at least partially surround loaded items which are to be secured by means of the load device. With this design, the load compartment partition can suitably be used as a fastening structure for the load securing element which ensures that the load is kept in place relative to the load compartment partition. Suitably, the load securing element is an elongate elastic element, such as a strap or a belt. By arranging the load securing element as an elongate elastic element, it can also be used to keep the load compartment partition in its collapsed condition, with its shortest length, during storage. It is also advantageous to arrange the load securing element as an elastic element in order to obtain a satisfactory load securing force which secures the items that are to be fastened.

According to one embodiment, the load device further comprises a fixing point which is arranged at a distance from and opposite to said second slide groove portion to allow said load holding element to be arranged at a distance from and parallel to the first slide groove portion, said load holding element having a longitudinal extension in the driving direction of the vehicle. This design allows the load holding element, preferably in the form of a load compartment partition as stated above, to be arranged so as to divide the load compartment in the driving direction of the vehicle.

To provide a robust and durable load device, the guide rail is suitably arranged to be attached to the load compartment floor of a vehicle. According to one embodiment, the guide rail can suitably be arranged along the edge of an openable and closable portion of the load compartment floor of a vehicle. By this design, a car manufacturer can optionally choose to equip a vehicle with a load device by choosing the openable and closable portion of the floor. Thanks to this design, it is also easy for a vehicle owner to equip his vehicle with a load device by obtaining and installing an openable and closable floor portion provided with a guide rail. To make it possible to mount a guide rail in a reliable and stable manner, the guide rail is suitably provided with attachment means which are arranged to secure said guide rail relative to the load compartment floor of a vehicle.

Furthermore, the guide rail is suitably provided with at least one engagement and disengagement portion to allow insertion and detachment of the load holding element of the load device. Suitably, this engagement and disengagement portion is arranged as a recess in the slide groove of the guide rail, which allows insertion and detachment of the load holding element. According to one embodiment, an engagement and disengagement portion is suitably arranged substantially at the centre of the extension of the second slide groove portion.

BRIEF DESCRIPTION OF THE DRAWINGS

The invention will now be described in greater detail by way of embodiments with reference to the accompanying drawings.

DESCRIPTION OF PREFERRED EMBODIMENTS

Figure 1:
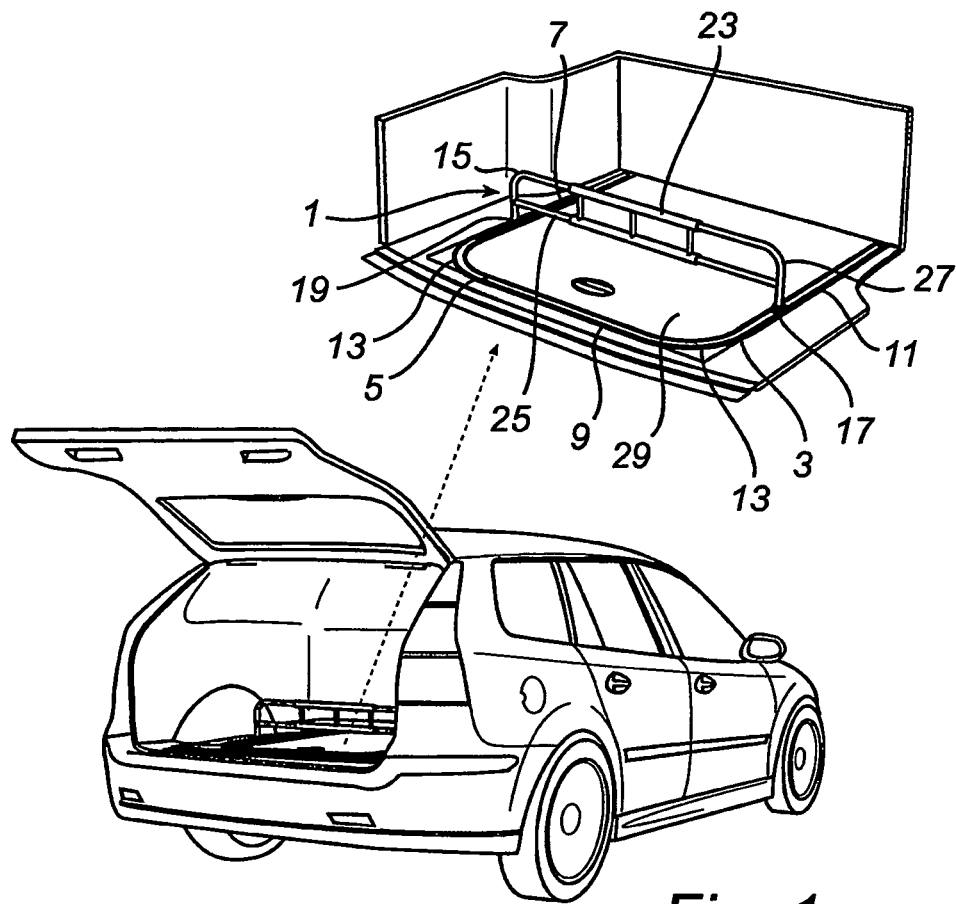
FIG. 1 is a perspective view of a load compartment of a vehicle provided with a load device according to one embodiment of the present invention.
Figure 2:
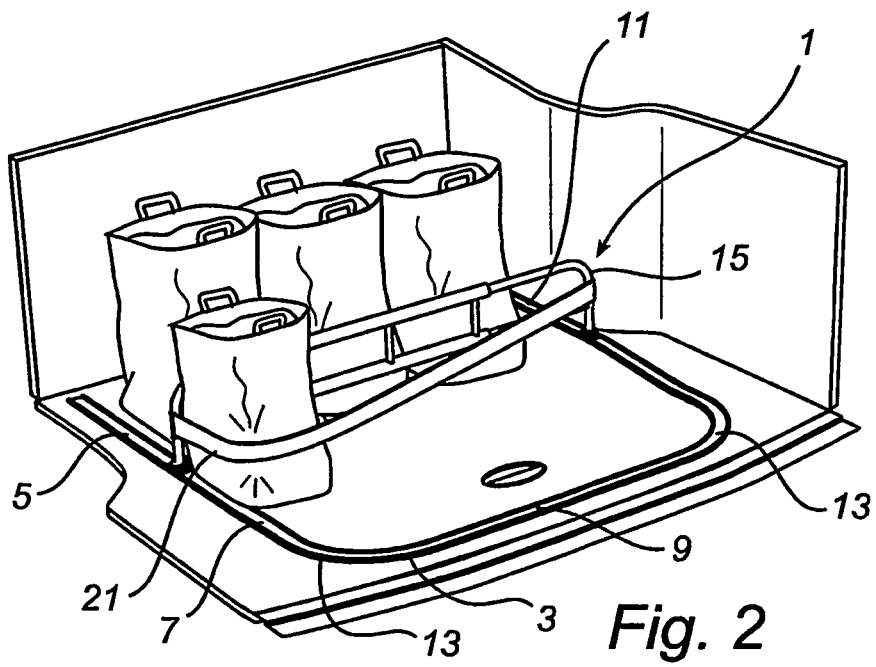
FIG. 2 is a perspective view of the load device according to FIG. 1, with loaded items secured by the load device.

FIGS. 1 and 2 are perspective view of a load device 1 for a vehicle according to one embodiment of the invention. The load device 1 according to FIGS. 1 and 2 is arranged in a load compartment of a car, in this case an estate car. The load device 1 comprises an elongate guide rail 3 which is formed with a slide groove 5. The guide rail 3 according to FIG. 1 and its associated slide groove 5 has a U-shaped extension with a first and a third slide groove portion 7, 11 extending in the driving direction of the vehicle and a second slide groove portion 9 substantially extending transversely to the driving direction of the vehicle between the first and the third slide groove portion 7, 11. The ends of the second slide groove portion 9 continuously merge into, respectively, the first and the third slide groove portion 7, 11. Accordingly, the first, second and third slide groove portions 7, 9, 11 of the guide rail 3 form a continuous and integral slide groove 5 along substantially the entire extension of the guide rail 3. The second slide groove portion 9 which extends transversely to the driving direction of the vehicle is arranged on a portion of the guide rail 3 which is located closest to the rear end of the vehicle, i.e. in the vicinity of the rear end of the load compartment.

According to the embodiment shown in FIGS. 1 and 2, the transitions between the first and the second slide groove portions 7, 9 and between the second and the third slide grove portions 9, 11 are arranged as curved portions 13, i.e. the slide groove 5 has a radius extending through an angle of about 90 degrees.

According to FIGS. 1 and 2, the slide groove 5 of the guide rail 3 is arranged to receive at least one load holding element 15 which is displaceable along said slide groove 5. According to the embodiment shown in FIGS. 1 and 2, two slide elements 17, 19 are displaceably connected to the guide rail 3. The slide elements 17, 19 are arranged at the respective ends of a load holding element 15 in the form of a load compartment partition, thus allowing the load compartment partition 15 to be displaced to an optional position along the slide groove 5.

When securing loaded items, the load compartment partition 15 can be optionally located in a desired position to limit the space in which the items to be loaded are placed. By limiting the space in which the items that are to be loaded are placed, there is a reduced risk of the items "rolling" around in the load compartment during transport. The items that are to be loaded in the load compartment of a vehicle can, for instance, be placed in a desired position, after which the load compartment partition 15 is placed in a position in which a loading space defined by the load compartment partition 15 corresponds substantially to the loading space taken up by the loaded items. As an alternative, the load compartment partition 15 can first be placed in a desired position, after which items that are to be transported are placed in the space defined by the load compartment partition 15. Thanks to the design of the guide rail 3, it is possible to place the load compartment partition 15 in a number of different positions, which makes it possible to adjust the loading space defined by the load compartment partition 15 in a flexible manner. Preferably, for safe load holding, the load compartment partition 15 is arranged to be lockable relative to the guide rail 3.

Alternatively, the load compartment partition 15 can be used to fix load securing elements 21, such as straps, belts or the like, which are arranged to surround one or more items that are to be secured. In this manner, loaded items can be kept in place relative to the load compartment partition 15, which prevents them from falling over or "rolling" around in the load compartment during transport. Advantageously, the load securing device 21 can, for instance, be elastic straps that are used to secure loaded items relative to the load compartment partition 15. According to one embodiment, such straps or belts 21 can be fixedly attached to the load compartment partition 15. According to an alternative embodiment, the straps or belts 21 can be detachable from the load compartment partition 15. The straps or belts 21 are, for instance, equipped with hooks or the like at their ends, which hooks can be hooked onto the load compartment partition 15.

The load compartment partition 15 according to FIG. 1 has an adjustable length, by parts of the load compartment partition 15 being displaceable relative to each other. According to that shown in FIG. 1, the load compartment partition is provided with a centre section 23 which receives in a displaceable manner a first side section 25 and a second side section 27 on each side of the centre section 23. The centre section 23 is provided with one or more guiding means allowing parts of the side sections 25, 27 to be received by the guiding means and displaced along the same. Thus, a load compartment partition 15 with a form of telescopic function is obtained, which allows the length of the load compartment partition to be adjusted.

Figure 3:
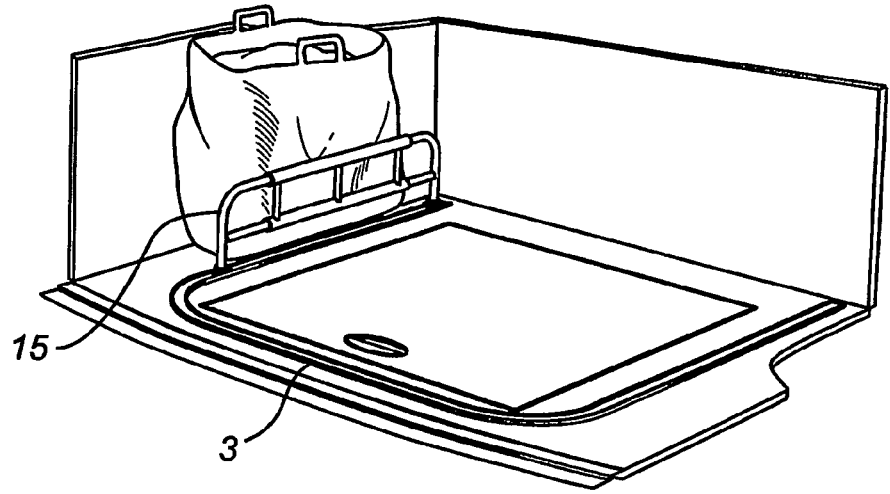
FIG. 3 is a perspective view of the load device according to FIG. 1, with a load compartment partition being located in a storage position along one side of the load compartment of a vehicle.

In FIG. 3, the load compartment partition 15 is shown in a position, in which it has been positioned with an extension in the driving direction of the vehicle at one side of the load compartment along the extension of the guide rail 3. This positioning of the load compartment partition 15 is possible because of the preferred U-shape of the guide rail 3, which allows the entire load compartment partition 15 to be movable from one side of the load compartment to the other. The possibility to place the load compartment partition 15 with an extension in the driving direction of the vehicle along one side of the load compartment is advantageous, among other things, when the load compartment partition is not used to secure a load. The load compartment partition 15 can, for instance, be kept in this position when long items are to be placed in the load compartment, in which case the load compartment partition 15 will not interfere with these long items. According to the embodiment shown in FIG. 3, it is also possible to use a space between the load compartment partition 15 and the side wall of the load compartment to secure loaded items. The space between the load compartment partition 15 and the side wall can, for instance, be formed so as to accommodate one or more carrier bags, such as bags of provision.

Figure 4A:
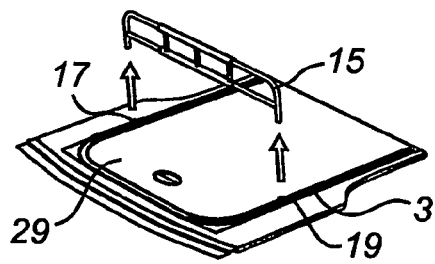
FIGS. 4a-4c are sequential perspective views of the load device according to FIG. 1, when the load compartment partition is being placed in a storage position under the floor of the load compartment of a vehicle.
Figure 4B:
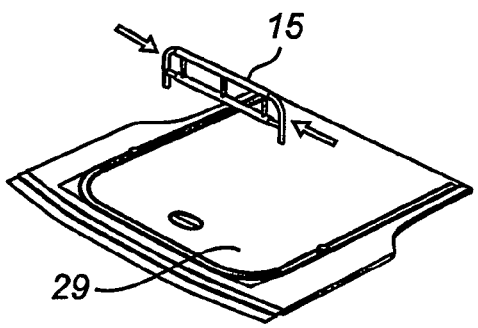
Figure 4C:
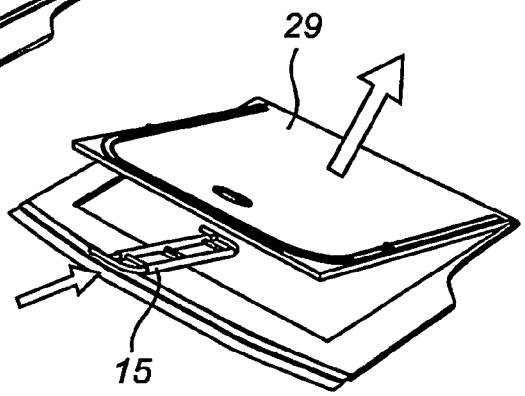

The load compartment partition 15 is preferably arranged to be detachable from its connection to said guide rail 3, as shown in FIGS. 4a-4c. According to one embodiment, the load compartment partition 15 can be arranged to be detachable from the slide elements 17, 19 which are rotatably arranged at its ends, in which case the slide elements 17, 19 are still connected to the guide rail 3 after removal of the load compartment partition 15. It will also be understood that the slide elements 17, 19 can be arranged to be detachable from their connection to the guide rail 3. The slide groove 5 of the guide rail 3 can; for instance, be provided with one or more engagement and disengagement portions (not shown) in the form of recesses, which allows the slide element 17, 19 to be moved into engagement with the guide rail 3 and be disengaged from the same. Thus, a kind of docking station is obtained for the slide element 17, 19, said docking station allowing quick and easy connection and release between the slide element 17, 19 and the guide rail 3.

According to an alternative embodiment, the load compartment partition 15 and its associated slide elements 17, 19 can be interconnected during the detachment from the guide rail 3. In this case, the rotary slide elements 17, 19 are preferably still connected to the load compartment partition 15 after disconnecting the latter from the guide rail 3.

Usually, the load compartment of a vehicle comprises an openable floor hatch 29, under which a storing space is arranged. According to the embodiment shown in FIGS. 4a-4c, it is possible, after disconnecting the load compartment partition 15 from the guide rail 3, to store the load compartment partition under the floor hatch 29 of the load compartment. The adjustable length of the load compartment partition 15 suitably allows it to be collapsible so as to take up less space when stored.

According to yet another alternative embodiment (not shown), the load compartment partition 15 can be arranged to be foldable. This makes it easier to load and unload items since they do not have to be lifted over the load compartment partition 15. Items that are to be loaded can, for instance, be placed in the load compartment of a vehicle, after which the load compartment partition 15 is raised and positioned in the desired position to secure the loaded items. According to yet another alternative embodiment (not shown), the load compartment partition 15 can be arranged to be adjustable in the vertical direction. This makes it possible to optionally adjust the extension of the load compartment partition 15 above the load compartment floor in an advantageous manner, depending on the height of the load which is to be secured and transported.

The guide rail 3 is suitably fixedly attached to the floor of the load compartment, for instance, by means of screws, rivets or other common fastening methods. According to the embodiment shown in FIGS. 1-2, the guide rail 3 is arranged on the edge of a portion of the floor of the load compartment, which portion is arranged as an openable hatch 29. By arranging the guide rail 3 on the edge of the hatch 29, it is possible to provide or not to provide the vehicle with a load device 1 by choosing a floor hatch 29 equipped or not equipped with a guide rail when assembling the vehicle. Consequently, this also makes it possible for a user to provide his vehicle with a load device 1 at a later stage, by obtaining a floor hatch 29 equipped with a guide rail 3 and by replacing the old floor hatch 29 with the new one.

According to an alternative embodiment, the guide rail 3 can be arranged inside the edge of the floor hatch 29. The guide rail 3 is suitably attached to the floor hatch 29 by means of common fastening methods, as stated above. According to yet another alternative embodiment, the guide rail 3 can be attached to the floor of the load compartment outside the extension of the floor hatch.

Figure 5:
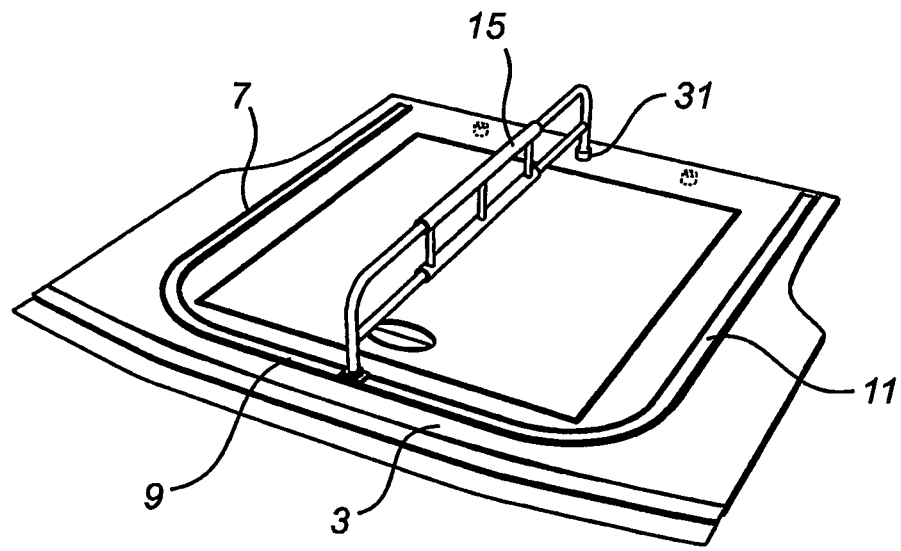
FIG. 5 is a perspective view of the load device according to an alternative embodiment, with a load compartment partition extending in the driving direction of the vehicle.

According to the embodiment shown in FIG. 5, the load device 1 can be provided with one or more fixing points 31 arranged, seen in the transverse direction of the vehicle, inside the two slide groove portions 7, 11 which extend in the driving direction of the vehicle. The fixing points 31 are located at a distance from the second slide groove portion 9 which extends in the transverse direction of the vehicle. The distances between the second slide groove portion 9 and the fixing points 31 correspond to the range within which the length of the adjustable load compartment partition 15 can be varied. According to that shown in FIG. 5, the fixing points 31 allow the load compartment partition to be placed in a position in which the load compartment partition 15 extends in the longitudinal direction of the vehicle inside the first and the third slide groove portion 7, 11. Accordingly, the load compartment can be divided in the longitudinal direction of the vehicle. When the load compartment partition 15 is arranged in this position, at least one end of the load compartment partition 15 is disconnected from the guide rail 3. The disconnected end is subsequently moved to a position in which it can be connected to the fixing point 31. In this position, the end of the load compartment partition 15 opposite to the fixing point 31 is connected to the guide rail 3. It will be understood that an alternative way of arranging the load compartment partition 15 may be, in a first stage, to disconnect the entire load compartment partition 15 from the guide rail 3, after which one end of the load compartment partition 15 is connected to the fixing point 31 and the end opposite thereto is connected to the guide rail 3. The load device 1 can optionally be provided with one or more fixing points 31.

Figure 6:
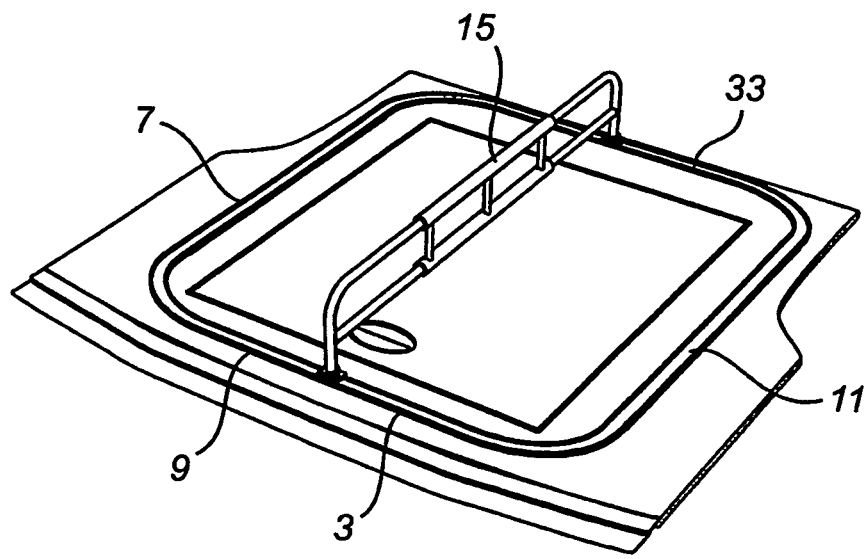
FIG. 6 is a perspective view of the load device according to yet another alternative embodiment, with a guide rail comprising a closed slide groove.

FIG. 6 shows yet another alternative embodiment of the load device 1. In the embodiment shown in FIG. 6, the guide rail 3 is a closed loop having a fourth slide groove portion 33 which is arranged at a distance from and opposite to the second slide groove portion 9. This fourth slide groove portion 33 extends transversely to the driving direction of the vehicle and is continuously connected to the first and the third slide groove portion 7, 11, which extend in the driving direction of the vehicle. Thanks to this design of the guide rail 3, the load compartment partition 15 can be optionally located in various positions. With this design, the load compartment partition 15 can, by being displaced along the slide groove 5, among other things, be placed both in a position in which the load compartment partition 15 extends in the driving direction of the vehicle and in a position in which the load compartment partition 15 extends in the transverse direction of the vehicle. As a result, the load compartment can be divided in an advantageous manner both in the driving direction and in the transverse direction of the vehicle.

According to other alternative embodiments, the load device 1 can have more than two transverse slide groove portions which are continuously connected to the first and third slide groove portions 7, 11 which extend in the driving direction of the vehicle. It will also be understood that such transverse slide groove portions do not have to extend all the way between the first and the second slide groove portion 7, 11, but can be arranged so as to be continuously connected only to one of the first and the second slide groove portion 7, 11.

The load device 1 may also comprise more than two slide groove portions extending in the longitudinal direction of the vehicle.

The guide rail 3 can be made of a number of suitable construction materials, such as aluminium, steel or plastic material.

Figure 7:
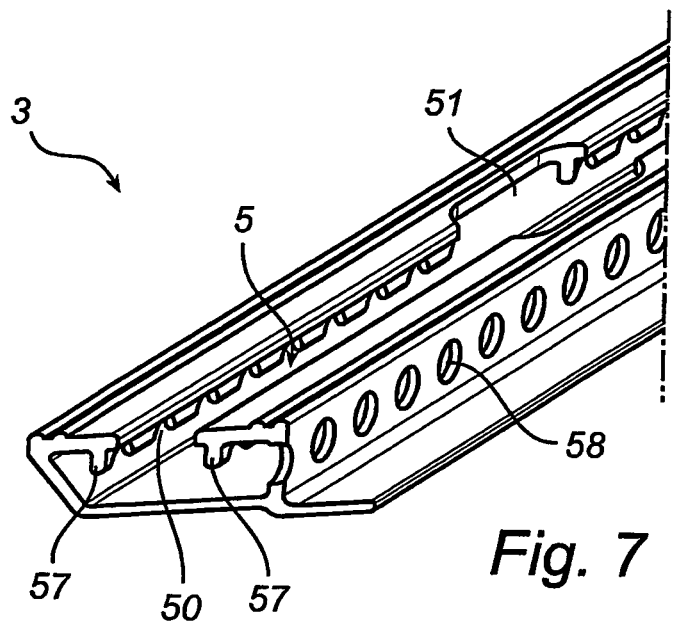
FIG. 7 shows a guide rail according to an additional currently preferred embodiment.
Figure 8A:
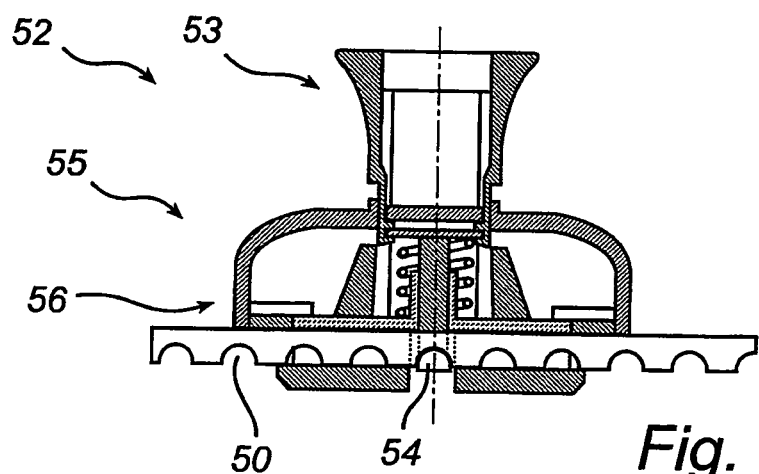
FIGS. 8a and 8b shows a fastener and the guide rail in FIG. 7.
Figure 8B:
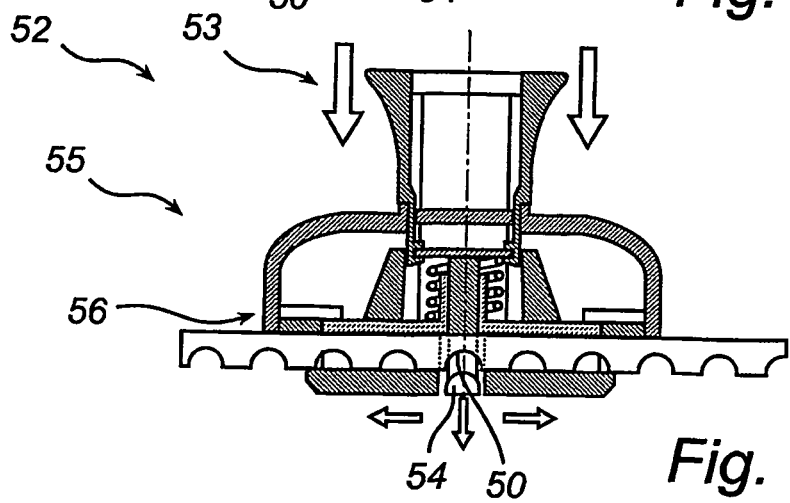

According to an additional currently preferred embodiment shown in FIGS. 7, 8a and 8b, the above mentioned at least one engagement and disengagement portion is preferably arranged in the slide groove 5 of the guide rail 3. As mentioned above the engagement and disengagement portions in the form of recesses allows the slide element to be moved into engagement with the guide rail 3. In the embodiment shown in FIG. 7 the guide rail 3 comprises a set of spaced recesses 50.

FIGS. 8a and 8b shows a fastener 52, which may be provided at the end portion of the slide elements 17, 19. The fastener has preferably, relatively to the guide rail 3, at least a sliding position, an engaged position and a detached position for undocking measures.

The fastener 52 comprises a manoeuvre portion 53 for manoeuvring a fastening portion 54 to be selectively received and engaged in one of the recesses 50. The manoeuvre portion 53 is moveable relatively a base portion 55 of the fastener 52. The manoeuvre portion 53 may for instance be biased towards the engaged position. The base portion 55 is provided with sliding portions 56 which slidingly interacts with the guiding rail at the sliding position. The interaction may be performed between the upper part of the guide rail 3 at the respective sides of the slide groove 5 and additionally or alternatively at the lower surface of the guide rail 3.

The guide rail 3 may be provided with at least one flange portion 57, which at least partly exhibits the recesses 50. The at least one flange portion 57 may be vertically extending, for instance in the form of two vertical ribs, as seen in FIG. 7.

As mentioned earlier above, the recesses 50 may allow the slide elements 17, 19 to be moved into engagement with the guide rail 3. When the slide element and/or manoeuvre portion 53 are pressed in a direction downwards, towards the sliding position, the fastening portion 54 is also moved downwards out of engagement with the recess 50. Thus, the sliding elements 17, 19 may then be moved as desired along the path defined by the guide rail to an another position. When no external force is applied to the fastener, the biased fastening portion will move in a direction upwards and be received in another recess. As can be seen in FIG. 7, a set of holes 58 are provided transversely the guide rail extension. The holes 58 are aligned with the recesses 50, thus both the recesses and the holes may be drilled within the same production process.

The slide elements 17, 19 may also be detached from the guide rail 3 by means of a docking station. In the embodiment shown in FIG. 7 the docking/undocking is achieved by moving the slide element 17; 19 to an adapted aperture 51 in the guide rail 3, wherein the fastener 52 may be docked or undocked to the guide rail.

It should be noted that the flange portions 57 may be arranged differently, for instance they may be extending horizontally. Also the form and position of the recesses 50 may be arranged differently. For instance the recesses may be provided at a lower end of the guide rail. Also the semicircle recess 50 may be circular or formed as an elongated hole.

According to another embodiment, not shown, the slide elements 17, 19 are provided with clamping elements. The clamping elements may be adapted to clamp the slide elements 17, 19 to a desired position at the guide rail. Thus, the slide elements may be adjusted in an essentially stepless way along the path of the guide rail 3.

The invention claimed is:

1. A load device for a vehicle, comprising
at least one rigid load compartment partition with a first end and a second end;
at least one elongate guide rail which is formed with a slide groove, said guide rail being configured to receive both the first end and the second end of the at least one rigid load compartment partition which is displaceable at the first end and the second end relative to the guide rail along said slide groove during positioning of said rigid load compartment partition in a desired position, wherein said guide rail has a first slide groove portion with a first direction of extension and a second slide groove portion with a second direction of extension deviating from the first, said slide groove portions continuously merging into each other.

2. A load device as claimed in claim 1, wherein said guide rail further comprises a third slide groove portion which is spaced-apart from the first slide groove portion, said third slide groove portion continuously merging into the second slide groove portion.

3. A load device as claimed in claim 2, wherein said second slide groove portion is arranged between said first and third slide groove portions, said third slide groove portion having a substantially parallel direction of extension relative to the first slide groove portion.

4. A load device as claimed in claim 2, wherein the direction of extension of said second slide groove portion is substantially transverse to the direction of extension of the first slide groove portion and a direction of extension of the third slide groove portion.

5. A load device as claimed in claim 2, wherein the guide rail has at least one additional fourth slide groove portion which is arranged substantially parallel to the second slide groove portion and continuously merges into at least one of the first and the third slide groove portion.

6. A load device as claimed in claim 5, wherein end portions of said fourth slide groove portion, at their respective ends, continuously merge into, respectively, the first and the third slide groove portion.

7. A load device as claimed in claim 1, wherein the direction of extension of the first slide groove portion is arranged in a driving direction of a vehicle and a direction of extension of the second slide groove portion is arranged substantially transversely to the driving direction of said vehicle.

8. A load device as claimed in claim 1, wherein the second slide groove portion is arranged on a portion of the guide rail which is located closest to a rear end of a vehicle.

9. A load device as claimed in claim 1, wherein said rigid load compartment partition consists of at least two parts which are configured to be extendable relative to each other so as to allow a length of the rigid load compartment partition to be adjustable.

10. A load device as claimed in claim 1, wherein the at least one rigid load compartment partition is configured to be detachable from said guide rail.

11. A load device as claimed in claim 1, wherein said rigid load compartment partition comprises a frame element and a load securing element which is configured to be connectable to said frame element and movable to at least partially surround loaded items which are to be secured by means of the load device.

12. A load device as claimed in claim 11, wherein said load securing element is an elongate elastic element.

13. A load device as claimed in claim 1, wherein said load device further comprises a fixing point which is arranged at a distance from and opposite to said second slide groove portion to allow said rigid load compartment partition to be arranged at a distance from and parallel to the first slide groove portion, said load compartment partition having a longitudinal extension in the driving direction of the vehicle.

14. A load device as claimed in claim 1, wherein said guide rail is directly attached to a load compartment floor of a vehicle.

15. A load device as claimed in claim 1, wherein said guide rail is arranged along an edge of an openable and closable portion of a load compartment floor of a vehicle.

16. A load device as claimed in claim 1, wherein said guide rail is provided with attachment means which are configured to secure said guide rail to a load compartment floor of a vehicle.

* * * * *